United States Patent
Nakashima et al.

(10) Patent No.: US 10,196,529 B2
(45) Date of Patent: Feb. 5, 2019

(54) METAL SURFACE COATING COMPOSITION AND TERMINAL FITTED ELECTRIC WIRE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP); KYUSHU UNIVERSITY, Fukuoka-shi, Fukuoka (JP); JXTG NIPPON OIL & ENERGY CORPORATION, Tokyo (JP)

(72) Inventors: Kazuo Nakashima, Yokkaichi (JP); Takehiro Hosokawa, Yokkaichi (JP); Tatsuya Hase, Yokkaichi (JP); Hiroki Hirai, Yokkaichi (JP); Junichi Ono, Yokkaichi (JP); Takuji Ootsuka, Yokkaichi (JP); Hideki Nomura, Yokkaichi (JP); Kazuhiro Goto, Osaka (JP); Makoto Mizoguchi, Fukuoka (JP); Koichi Yoshida, Tokyo (JP); Kenichi Komiya, Tokyo (JP); Takashi Arai, Tokyo (JP); Yuji Shitara, Tokyo (JP); Kazuhiro Yagishita, Tokyo (JP)

(73) Assignees: AutoNetworks Technologies, Ltd., Yokkaichi-shi, Mie (JP); Sumitomo Wiring Systems, Ltd., Yokkaichi-shi, Mie (JP); SUMITOMO ELECTRIC INDUSTRIES, LTD., Osaka-shi, Osaka (JP); KYUSHU UNIVERSITY, Fukuoka-shi, Fukuoka (JP); JXTG Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 15/580,594

(22) PCT Filed: May 23, 2016

(86) PCT No.: PCT/JP2016/065176
§ 371 (c)(1),
(2) Date: Dec. 7, 2017

(87) PCT Pub. No.: WO2016/199569
PCT Pub. Date: Dec. 15, 2016

(65) Prior Publication Data
US 2018/0179400 A1  Jun. 28, 2018

(30) Foreign Application Priority Data
Jun. 11, 2015  (JP) ................... 2015-118417

(51) Int. Cl.
*H01R 4/20* (2006.01)
*H01B 7/28* (2006.01)
(Continued)

(52) U.S. Cl.
CPC ............. *C09D 7/63* (2018.01); *C09D 5/08* (2013.01); *C09D 5/082* (2013.01); *C09D 5/084* (2013.01);
(Continued)

(58) Field of Classification Search
CPC ..................... H01R 4/20; H01B 7/28
(Continued)

(56) References Cited

U.S. PATENT DOCUMENTS

| | | | | |
|---|---|---|---|---|
| 3,944,384 A | * | 3/1976 | Poynton | D06M 15/667 260/DIG. 24 |
| 7,732,385 B2 | * | 6/2010 | Yagishita | C10M 141/10 508/188 |

(Continued)

FOREIGN PATENT DOCUMENTS

| | | |
|---|---|---|
| EP | 2980273 A | 2/2016 |
| JP | 2011105831 A | 6/2011 |

(Continued)

OTHER PUBLICATIONS

International Search Report for Application No. PCT/JP2016/065176 dated Aug. 16, 2016; 9 pages.

*Primary Examiner* — Chau N Nguyen
(74) *Attorney, Agent, or Firm* — Reising Ethington, P.C.

(57) ABSTRACT

A metal surface coating composition including a high-consistency material containing a lubricant base oil and an amide compound, and a composition of a phosphorus compound containing one or more compounds represented by the below formulae and a metal, wherein the ratio (a/b) of the number of amide groups (a) and the number of acidic groups (b) is within a range of 1.1 to 6.0:

(Continued)

[Chem. 1]

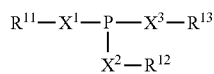

(1)

[Chem. 2]

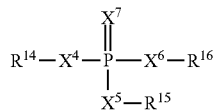

(2)

where $X^1$ to $X^7$ represent an oxygen atom or a sulfur atom, $R^{11}$ to $R^{13}$ represent a hydrogen atom or a hydrocarbon group having 1 to 30 carbon atoms, wherein at least one of them is a hydrocarbon group having 1 to 30 carbon atoms, and $R^{14}$ to $R^{16}$ represent a hydrogen atom or a hydrocarbon group having 1 to 30 carbon atoms wherein at least one of them is a hydrocarbon group having 1 to 30 carbon atoms.

7 Claims, 2 Drawing Sheets

(51) Int. Cl.
| | |
|---|---|
| *C09D 7/63* | (2018.01) |
| *C09D 5/08* | (2006.01) |
| *C10M 137/06* | (2006.01) |
| *C10M 141/10* | (2006.01) |
| *C09D 201/00* | (2006.01) |
| *C10M 133/16* | (2006.01) |
| *C09D 7/40* | (2018.01) |
| *C09D 191/00* | (2006.01) |
| *H01B 3/20* | (2006.01) |
| *H02G 15/04* | (2006.01) |
| *C23F 11/167* | (2006.01) |
| *H01R 4/18* | (2006.01) |

(52) U.S. Cl.
CPC ............... *C09D 5/086* (2013.01); *C09D 7/40* (2018.01); *C09D 191/00* (2013.01); *C09D 201/00* (2013.01); *C10M 133/16* (2013.01); *C10M 137/06* (2013.01); *C10M 141/10* (2013.01); *C23F 11/167* (2013.01); *C23F 11/1673* (2013.01); *H01B 3/20* (2013.01); *H01B 7/2806* (2013.01); *H02G 15/04* (2013.01); *C10M 2215/08* (2013.01); *C10M 2223/042* (2013.01); *C10M 2223/045* (2013.01); *C10M 2223/047* (2013.01); *C10M 2223/049* (2013.01); *C10N 2210/01* (2013.01); *C10N 2210/02* (2013.01); *C10N 2210/03* (2013.01); *C10N 2210/04* (2013.01); *C10N 2230/08* (2013.01); *C10N 2230/10* (2013.01); *C10N 2230/12* (2013.01); *C10N 2240/50* (2013.01); *C10N 2250/121* (2013.01); *H01R 4/185* (2013.01)

(58) Field of Classification Search
USPC ................................ 174/84 C, 119 C, 138 F
See application file for complete search history.

(56) References Cited

U.S. PATENT DOCUMENTS

| | | | |
|---|---|---|---|
| 9,721,700 B2 * | 8/2017 | Kuriyagawa | H01B 7/285 |
| 2006/0172900 A1 | 8/2006 | Yagishita et al. | |
| 2006/0217471 A1 * | 9/2006 | Shooshtari | C08K 5/04 524/236 |
| 2010/0256027 A1 | 10/2010 | Miyamoto et al. | |
| 2013/0098679 A1 * | 4/2013 | Takata | C08L 23/26 174/74 R |
| 2016/0211053 A1 | 7/2016 | Hase et al. | |
| 2017/0117650 A1 | 4/2017 | Yoshida et al. | |

FOREIGN PATENT DOCUMENTS

| | | |
|---|---|---|
| JP | 4811408 B2 | 11/2011 |
| WO | WO2009022629 | 2/2009 |
| WO | WO2015056546 A | 4/2015 |
| WO | WO2015146985 A | 10/2015 |

\* cited by examiner

METAL SURFACE COATING COMPOSITION AND TERMINAL FITTED ELECTRIC WIRE

CROSS REFERENCE TO RELATED APPLICATIONS

This application claims the priority of Japanese patent application JP2015-118417 filed on Jun. 11, 2015, the entire contents of which are incorporated herein.

TECHNICAL FIELD

The present application relates to a metal surface coating composition and a terminal fitted electric wire and, more specifically, to a metal surface coating composition excellent in adhesion to a metal and a terminal fitted electric wire which is anti-corrosion treated with the metal surface coating composition.

BACKGROUND ART

In metal equipment and metal parts, grease is used for the purpose of lubrication and corrosion resistance. For example, Patent Literature 1 (JP4811408B) describes the use of grease containing a perfluoroether base oil, a consistency improver, barium sulfate, or antimony oxide to machinery parts.

SUMMARY

The grease disclosed in Patent Literature 1 shows poor adhesion to the metal. Especially, under the high temperature conditions, the grease is likely to cause leakage from the metal surface, and thus difficulty arises in protecting the metal surface stably. This is presumably because that the grease of Patent Literature 1 does not chemically bonded with the metal surface, but it merely adheres to the metal surface through the Van der Waals force, which is lower in absorption.

It is an object of the present application to provide a metal surface coating composition excellent in adhesion to the metal and a terminal-fitted electric wire improved in corrosion resistance by using the composition.

In order to solve the foregoing problem, the metal surface coating composition according to the present application contains a high-consistency material comprising a lubricant base oil and an amide compound, and a composition of a phosphorus compound comprising one or more compounds represented by the general formulae (1) and (2) and a metal, wherein the ratio (a/b) of the number of amide groups (a) and the number of acidic groups (b) is within a range of 1.1 to 6.0:

[Chem. 1]

(1)

[Chem. 2]

(2)

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms, among which at least one is a hydrocarbon group having 1 to 30 carbon atoms, and $R^{14}$ to $R^{16}$ each represent independently a hydrogen atom or a hydrocarbon group having 1 to 30 carbon atom among which at least one is a hydrocarbon group having 1 to 30 carbon atoms.

The composition of the phosphorus compound and the metal is preferably made of at least one of a metal hydroxide and a metal carboxylate, and the phosphorus compound. The metal carboxylate is preferably a metal salicylate.

The amide compound preferably contains one or more compounds represented by the following general formulae (3) to (5):

[Chem. 3]

(3)

[Chem. 4]

(4)

[Chem. 5]

(5)

where $R^{21}$ to $R^{26}$ each represent independently a saturated or unsaturated linear hydrocarbon group having 5 to 25 carbon atoms, $R^{22}$ may be hydrogen, and $Y^{31}$ and $Y^{32}$ represent a divalent hydrocarbon group having 1 to 10 carbon atoms selected from an alkylene group and a phenylene group having 1 to 10 carbon atoms, or an alkylphenylene group having 7 to 10 carbon atoms.

The amide compound preferably is a fatty acid amide having a melting point within a range of 20° C. to 200° C.

The phosphorus compound preferably has one or more branched linear structures or one or more carbon-carbon double bond structures in the structure of the hydrocarbon groups having 4 to 30 carbon atoms.

The metal forming the composition together with the phosphorus compound is at least one selected from alkali metals, alkaline earth metals, aluminum, titanium, and zinc.

The composition of the phosphorus compound and the metal preferably has a molecular weight of 3000 or lower.

The terminal-fitted electric wire according to the present application is a wire in which an electric connection part between a terminal and an electric conductor is covered with the metal surface coating composition.

The metal surface coating composition according to the present application includes the high-consistency material containing the lubricating base oil and the amide compound, and the composition of the specified phosphorus compound and the metal. Further, the ratio (a/b) of the number of amide groups (a) and the number of acidic groups (b) is within a range of 1.1 to 6.0, and thus the metal surface coating composition according to the present application is excellent in adhesion to the metal and protects stably the metal surface.

In the metal surface coating composition according to the present application, the phosphorus compound has one or more branched linear structures or one or more carbon-carbon double bond structures in the structure of the hydrocarbon group having 1 to 30 carbon atoms, which contributes to improvement in compatibility with the lubricant base oil.

Further, the metal forming the composition together with the phosphorus compound is at least one member selected from alkali metals, alkaline earth metals, aluminum, titanium, and zinc, which leads to improvement in adhesion when the metal surface coating composition is applied to a metal surface.

The composition of the phosphorus compound and the metal has a molecular weight of 3000 or lower, which contributes to improvement in compatibility with the lubricant base oil.

Then, in the terminal-fitted electric wire according to the present application, since an electric connection part between a terminal and an electric conductor is covered with the metal surface coating composition, stable corrosion resistance can be provided for a long time.

DESCRIPTION OF EMBODIMENTS

Next, a preferred embodiment of the present application is to be described specifically.

The metal surface coating composition according to the present application (hereinafter sometimes referred to as the present composition) includes a high-consistency material containing a lubricant base oil and an amide compound, and a composition of a specified phosphorus compound and a metal.

The lubricant base oil usable herein includes one of an arbitrary mineral oil, a wax isomerized oil, and a synthetic oil or a mixture of two or more of them used as usual lubricant base oils. The mineral oil usable herein are specifically paraffinic and naphthenic oils, and n-paraffin, which are purified from lubricant fractions contained by distillation under ordinary pressure or distillation under reduced pressure of crude oils by appropriately combining purification treatments such as solvent deasphaltation, solvent extraction, hydrocracking, solvent dewaxing, catalytic dewaxing, hydrorefining, sulfuric acid cleaning, and white clay treatment of a lubricant oil fractions.

The wax isomerized oils usable herein include those prepared through a hydrogen isomerization treatment of a wax raw material, such as natural wax, e.g., petroleum slack wax obtained through solvent dewaxing of a hydrocarbon oil, or a synthetic wax formed by the so-called Fischer Tropsch synthetic process, in which a mixture of carbon monoxide and hydrogen is brought in contact with a suitable synthetic catalyst at a high temperature and a high pressure. In a case of using the slack wax as the wax raw material, since the slack wax contains large amounts of sulfur and nitrogen, which are unnecessary in the lubricant base oil, it is desirable that the slack wax is hydrogenated as needed to prepare and use the wax having been reduced in the sulfur content and the nitrogen content, which is thus used as a raw material.

The synthetic oil is not particularly limited, and includes, for example, a poly-α-olefin, such as a 1-octene oligomer, 1-decene oligomer, and ethylene-propylene oligomer or a hydrogenated product thereof, isobutene oligomer and hydrogenated products thereof, isoparaffin, alkylbenzene, alkylnaphthalene, diester (for example, ditridecyl glutarate, di-2-ethylhexyl adipate, diisodecyl adipate, ditridecyl adipate, and di-2-ethylhexyl sebacate), polyol ester (for example, trimethylolpropane caprylate, trimethylolpropane pelargonate, pentaerythritol-2-ethylhexanoate, and pentaerythritol pelargonate), polyoxyalkylene glycol, dialkyl diphenyl ether, polyphenyl ether, etc.

The kinematic viscosity of the lubricant base oil is not particularly limited. Usually, it is preferably from 1 to 150 mm$^2$/s at 100° C. The kinematic viscosity at 100° C. is more preferably within a range of 2 to 120 mm$^2$/s because the volatility and the handleability in production are excellent. The kinematic viscosity is measured according to JIS K 2283.

The amide compound forms a network structure by hydrogen bonds in the lubricant base oil. This provides the lubricant base oil with the consistency to form a grease-like high-consistency material. That is, when it is used together with the lubricant base oil, a gel-like product is formed at a normal temperature. That is, amide compound gels (semi-solidifies) the liquid lubricant base oil at a normal temperature. The high-consistency material is maintained due to its consistency on the coat surface of the material to be coated at a normal or heat temperature.

The amide compound is a compound having one or more amide groups (—NH—CO—), and a mono-amide compound having one amide group or a bis-amide compound having two amide groups can be used preferably.

Compounds, for example, represented by the following general formulae (3) to (5) can be used as the amide compound. They may be used alone or two or more of them may be used in combination.

[Chem. 3]

$$R^{21}\text{---CO---NH---}R^{22} \quad (3)$$

[Chem. 4]

$$R^{23}\text{---CO---NH---}Y^{31}\text{---NH---CO---}R^{24} \quad (4)$$

[Chem. 5]

$$R^{25}\text{---NH---CO---}Y^{32}\text{---CO---NH---}R^{26} \quad (5)$$

In the general formulae (3) to (5), $R^{21}$ to $R^{26}$ each represent independently a saturated or unsaturated linear hydrocarbon group having 5 to 25 carbon atoms, provided that $R^{22}$ may be hydrogen; and $Y^{31}$ and $Y^{32}$ each represent a divalent hydrocarbon group having 1 to 10 carbon atoms selected from an alkylene group or a phenylene group having 1 to 10 carbon atoms, and an alkylphenylene group having 7 to 10 carbon atoms. Further, in the general formulae (3) to (5), hydrogen of the hydrocarbon group constituting $R^{21}$ to $R^{26}$ may be partially substituted by a hydroxyl group (—OH).

The amide compound represented by the general formula (3) includes, specifically, a saturated fatty acid amide such as lauric acid amide, palmitic acid amide, stearic acid amide, behenic acid amide, and hydroxystearic acid amide, an unsaturated fatty acid amide such as oleic acid amide and erucic acid amide, and a substituted amide of a saturated or unsaturated long-chain fatty acid and a long-chain amine such as stearylstearic acid amide, oleyloleic acid amide, oleylstearic acid amide, and stearyloleic acid amide. Among them, an amide compound in which at least one of $R^{21}$ to $R^{22}$ in the general formula (3) is a saturated linear hydrocarbon group having 12 to 20 carbon atoms, for example, an amide compound in which $R^{21}$ is a saturated linear hydrocarbon group having 12 to 20 carbon atoms and $R^{22}$ is a hydrogen atom in the general formula (3), or an amide compound in which each of $R^{21}$ and $R^{22}$ in the general formula (3) is saturated linear hydrocarbon group having 12 to 20 carbon atoms is preferred. More specifically, stearylstearic acid amide is preferred.

The amide compound represented by the general formula (4) includes, specifically, ethylene bisstearic acid amide, ethylene bisisostearic acid amide, ethylene bisoleic acid amide, methylene bislauric acid amide, hexamethylene bisoleic acid amide, hexamethylene bishydroxystearic acid amide, and m-xylylene bisstearic acid amide. Among them, an amide compound in which at least one of $R^{23}$ and $R^{24}$ in the general formula (4) is a saturated linear hydrocarbon group having 12 to 20 carbon atoms, for example, an amide compound in which $R^{23}$ is a saturated linear hydrocarbon group having 12 to 20 carbon atoms and $R^{24}$ is a hydrogen atom in the general formula (4), or an amide compound in which each of $R^{23}$ and $R^{24}$ is a saturated linear hydrocarbon group having 12 to 20 carbon atoms in the general formula (4) is preferred. More specifically, ethylene bisisostearic acid amide is preferred.

The amide compound represented by the general formula (5) includes specifically, for example, N,N'-distearyl sebacic acid amide. Among them, an amide compound in which at least one of $R^{25}$ and $R^{26}$ in the general formula (5) is a saturated linear hydrocarbon group having 12 to 20 carbon atoms, for example, an amide compound in which $R^{25}$ is a saturated linear hydrocarbon group having 12 to 20 carbon atoms and $R^{26}$ is a hydrogen atom in the general formula (5) or an amide compound in which each of $R^{25}$ and $R^{26}$ in the general formula (5) is a saturated linear hydrocarbon group having 12 to 20 carbon atoms is preferred.

From a viewpoint of tending to keep a gel state (semi-solid state) at a normal temperature when mixed with a lubricant base oil or tending to keep a gel-state (semi-solid state), the amide compound preferably has a melting point of 20° C. or higher. It is more preferably 50° C. or higher, even more preferably 80° C. or higher, and particularly preferably 120° C. or higher. Further, the melting point is preferably 200° C. or lower, more preferably 180° C. or lower, even more preferably 150° C. or lower. Further, the molecular weight of the amide compound is preferably within a range of 100 to 1000, and more preferably within a range of 150 to 800.

From a viewpoint of tending to keep the gel-state (semi-solid state) at a normal temperature when mixed with the lubricant base oil and tending to keep a gel state (semi-solid state) at a normal temperature, the content of the amide compound is preferably 1 mass part or more with respect to 100 mass parts of the lubricant base oil. It is more preferably 2 mass parts or more, and even more preferably 5 mass parts or more. Further, it is preferably 70 mass parts or less, more preferably 60 mass parts or less, and even more preferably 50 mass parts or less with respect to 100 mass parts of the lubricant base oil. Preferably, it is 60 mass parts or less, and more preferably 50 mass parts or less.

A specified phosphorus compound contains one or more compounds represented by the following general formulae (1) and (2):

[Chem. 6]

(1)

-continued

[Chem. 7]

(2)

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms and at least one of them is a hydrocarbon group having 1 to 30 of carbon atoms, $R^{14}$ to $R^{16}$ each represent independently a hydrogen atom or a hydrocarbon group having 1 to 30 carbon atom and at least one of them is a hydrocarbon group having 1 to 30 carbon atoms.

The hydrocarbon group includes, for example, alkyl group, cycloalkyl group, alkyl-substituted cycloalkyl group, alkenyl group, aryl group, alkyl-substituted aryl group, and aryl alkyl group.

The alkyl group includes, for example, methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group. They may be either linear or branched.

The cycloalkyl group includes, for example, cyclopentyl group, cyclohexyl group, and cycloheptyl group. The alkyl-substituted cycloalkyl group includes, for example, methylcyclopentyl group, dimethylcyclopentyl group, methylethylcyclopentyl group, diethylcyclopentyl group, methylcyclohexyl group, diethylcyclohexyl group, methylethylcyclohexyl group, diethylcyclohexyl group, methylcycloheptyl group, dimethylcycloheptyl group, methylethylcyclopeptyl group, and diethylcycloheptyl group. The substitution position of the alkyl-substituted cycloalkyl group is not particularly restricted. The alkyl group may be linear or branched.

The alkenyl group includes, for example, butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, and octadecenyl group. They may be either linear or branched.

The aryl group includes, for example, phenyl group, and naphthyl group. Alkyl-substituted aryl group includes, for example, tolyl group, xylyl group, ethylphenyl group, propylphenyl group, butylphenyl group, pentylphenyl group, hexylphenyl group, heptylphenyl group, octylphenyl group, nonylphenyl group, decylphenyl group, undecylphenyl group and dodecylphenyl group. The substitution position of the alkyl substituted aryl group is not particularly restricted. The alkyl group may be linear or branched. The arylalkyl group includes, for example, benzyl group, phenylethyl group, phenylpropyl group, phenylbutyl group, phenylpengyl group, and phenylhexyl group. The alkyl group may be linear or branched.

All of $X^1$ to $X^7$ are preferably oxygen atoms. The hydrocarbon group of $R^{11}$ to $R^{16}$ having 1 to 30 carbon atoms are preferably hydrocarbon groups having 4 to 30 carbon atoms, and more preferably hydrocarbon groups having 8 to 30 carbon atoms.

Preferably, all of $X^1$ to $X^7$ are oxygen atoms. Preferably, at least one of $R^{11}$ to $R^{13}$ is a hydrogen atom and at least one of them is a hydrocarbon group having 1 to 30 carbon atoms.

Preferably, at least one of $R^{14}$ to $R^{16}$ is a hydrogen atom and at least one of them is a hydrocarbon group having 1 to 30 carbon atoms.

The phosphorus compound represented by the general formula (1) includes, for example, phosphorous acid, monothiophosphorous acid, dithiophosphorous acid, phosphite monoester, monothiophosphite monoester, dithiophosphite monoester, phosphite diester, monothiophosphite diester, dithiophosphite diester, phosphite triester, monothiophosphite triester, and dithiophosphite triester. They may be used alone or two or more of them may be used in combination as the phosphorus compounds represented by the general formula (1).

The phosphorus compound represented by the general formula (2) includes, for example, phosphoric acid, monothiophosphoric acid, dithiophosphoric acid, phosphate monoester, monothiophosphate monoester, dithiophosphate monoester, phosphate diester, monothiophosphate diester, dithiophosphate diester, phosphate triester, monothiophosphate triester, and dithiophosphate triester. They may be used alone or two or more of them may be used in combination as the phosphorus compound represented by the general formula (2).

For the phosphorus compound, from a viewpoint of the following compatibility improving effect, stickiness improving effect, adhesion improving effect, etc., the phosphorus compound represented by the general formula (2) is more preferred. Further, among the phosphorus compounds represented by the general formula (2), acidic phosphate ester represented by the following general formula (6) or general formula (7) is particularly preferred.

(Chem. 8)

$$P(=O)(-OR^{14})(-OH)_2 \qquad (6)$$

(Chem. 9)

$$P(=O)(-OR^{14})_2(-OH) \qquad (7)$$

In the composition of the specified phosphorus compound and the metal, the phosphate group (P—O⁻ group) is also ionically bonded to the coating surface of the material to be coated thereby contributing to firm adhesion of the high-consistency film containing the high-consistency material and the composition of the specified phosphorus compound and the metal to the coating surface. By being formed as the composition together with the metal, the ionic bondability of the phosphate group (P—O⁻ group) is improved to promote ion bonding. Further, by being formed as the composition together with the metal, the composition of the specified phosphorus compound and the metal is made adhesive. Further, composition formed together with the metal lowers the acidity of the specified phosphorus compound (pH increase), thereby suppressing corrosion of the metal surface to be coated with the specified phosphorus compound.

The metal forming the composition with the specified phosphorus compound preferably has 2 or more valence from a viewpoint of heat resistance.

The metal that forms the composition together with the specified phosphorus compound includes, for example, alkali metal such as Li, Na, and K, alkaline earth metal such as Mg and Ca, aluminum, titanium, zinc, etc. They may be used alone or two or more of them may be used in combination. The salts of the metals can provide high adsorption to the metal surface. Further, since the ionization tendency is, for example, higher than that of Sn, it can be excellent in the ion bondability to Sn. Among them, Ca and Mg are more preferred from a viewpoint for example, of waterproofness.

The composition of the specified phosphorus compound and the metal can be formed by mixing a specified phosphorus compound and a metal-containing compound (metal ion supplying source). The metal-containing compound includes metal hydroxides, metal carboxylates, etc. The carboxylic acid of the metal carboxylates includes salicylic acid, benzoic acid, phthalic acid, etc. The metal salt of the carboxylic acid is a neutral salt and, further, may be a basic salt obtained by heating excess metal, metal oxide or metal hydroxide in the presence of water, or may be a super basic salt obtained by reacting metal, metal oxide or metal hydroxide in the presence of gaseous carbon dioxide, boric acid, and borate may be used. Among them, super basic salicylic acid or the like is preferred as the metal-containing compound (metal ion supplying source) from a viewpoint of the solubility and reactivity of metal ions during reaction.

For the composition of the specified phosphorus compound and the metal, a composition previously formed by separately mixing a specified phosphorus compound and a metal-containing compound (metal ion supplying source) may be used, or a composition formed by mixing a specified phosphorus compound and a metal-containing compound (metal ion supplying source) together with a lubricant base oil and an amide compound to form a composition during mixing may also be used. Further, a composition formed by mixing a previously prepared high-consistency material containing a lubricant base oil and an amide compound together with a specified phosphorus compound and a metal-containing compound (metal ion supplying source) may also be used.

From a viewpoint of forming a composition reliably at a desired blending ratio, it is preferable to use a composition formed previously by separately mixing a specified phosphorus compound and a metal-containing compound (metal ion supplying source) as the composition of the specified phosphorus compound and the metal.

In the composition of the specified phosphorus compound and the metal, when at least one of the hydrocarbon group of the specified phosphorus compound is a hydrocarbon group having 4 to 30 carbon atoms, the compatibility with the lubricant base oil, which is the long-chained alkyl compound, is improved. The hydrocarbon group is an organic group containing carbon and hydrogen but not containing hetero elements such as N, O, and S. Then, in view of the compatibility with the lubricant base oil which is the long-chained alkyl compound, the hydrocarbon group of the specified phosphorus compound is preferably an aliphatic hydrocarbon group or a cycloaliphatic hydrocarbon group. More preferably, it is an aliphatic hydrocarbon group.

The aliphatic hydrocarbon group includes alkyl group containing a saturated hydrocarbon and, an alkenyl group containing an unsaturated hydrocarbon, each of which may be used. The alkyl group or the alkenyl group as the aliphatic hydrocarbon group may be either in a linear or branched structure. However, when the alkyl group is a linear alkyl group such as an n-butyl group or n-octyl group, alkyl groups tend to be aligned to each other and increase the crystallinity of the composition of the specified phosphorus compound and the metal, lowering the solubility with the lubricant base oil. In view of the above, when the hydrocarbon group is an alkyl group, a branched alkyl group is more preferred compared to a linear alkyl group. On the other hand, since the alkenyl group has one or more carbon-carbon double bond structures, it has not so-high crystallinity even if it has a linear structure. Accordingly, the alkenyl group may either be linear or branched.

When the number of carbon atoms of at least one hydrocarbon group is less than 4, the specified phosphorus compound becomes inorganic. Further, the specified phosphorus compound tends to increase the crystallinity. Then, it shows poor solubility with the lubricant base oil and is no longer miscible with the lubricant base oil. On the other hand, if the number of carbon atoms of the hydrocarbon group is more than 30, the specified phosphorus compound shows excessively high viscosity and tends to lower the fluidity. The number of carbon atoms of the hydrocarbon group is preferably 5 or more and, more preferably, 6 or more in view of the compatibility with the lubricant base oil. Further, the number of carbon atoms of the hydrocarbon group is preferably 26 or less and, more preferably, 22 or less from a viewpoint of fluidity, etc.

Further, the composition of the specified phosphorus compound and the metal has a phosphate group (polar group) and a non-polar group (hydrocarbon group in the ester portion) together in the molecule, and can be present in a layered state in which polar groups are associated to each other and non-polar groups are associated to each other and, accordingly, the composition can be a highly viscous liquid even in a non-polymerized state. If it is a viscous liquid, the composition can be adhered more intensely to the metal surface by utilizing the physical adsorption due to Van der Waals force. It is considered that the viscosity is obtained by the entanglement caused between linear molecular chains to each other. In view of the above, it is preferred not to promote crystallization of the specified phosphorus compound. Specifically, for this purpose, hydrocarbon group has a number of hydrocarbon from 4 to 30, has one or more branched chain structures or one or more carbon-carbon double bond structures, etc.

From a viewpoint of the adhesion, it is necessary that the specified phosphorus compound forms a composition together with the metal. When the specified phosphorus compound itself which is not composited with the metal is used, the polarity of the phosphate group portion is small, the association between the polar phosphate groups (cohesion property) is low, and a liquid of high viscosity is not formed. Accordingly, adhesion (viscosity) is low. Further, when it is composited with ammonia or amine, the polarity at a portion of the phosphate (amine salt) is small, and the association (cohesion property) between the phosphates (amine salts) which are polar groups to each other is low, failing to form a liquid at high viscosity. Accordingly, the adhesion (viscosity) is low.

The hydrocarbon group includes more specifically, for example, oleyl group, stearyl group, isostearyl group, 2-ethylhexyl group, butyloctyl group, isomyristyl group, isocetyl group, hexyldecyl group, octyldecyl group, octyldodecyl group, and isobehenyl group.

Then, the specific acid phosphate ester includes, for example, butyloctyl acid phosphate, isomyristyl acid phosphate, isocetyl acid phosphate, hexyldecyl acid phosphate, isostearyl acid phosphate, isobehenyl acid phosphate, octyldecyl acid phosphate, octyldodecyl acid phosphate, isobutyl acid phosphate, 2-ethylhexyl acid phosphate, isodecyl acid phosphate, lauryl acid phosphate, tridecyl acid phosphate, stearyl acid phosphate, oleyl acid phosphate, myristyl acid phosphate, palmityl acid phosphate, di-butyloctyl acid phosphate, di-isomyristyl acid phosphate, di-isocetyl acid phosphate, di-hexyldecyl acid phosphate, di-isostearyl acid phosphate, di-isobehenyl acid phosphate, di-octyldecyl acid phosphate, di-octyldodecyl acid phosphate, di-isobutyl acid phosphate, di-2-ethylhexyl acid phosphate, di-isodecyl acid phosphate, di-tridecyl acid phosphate, di-oleyl acid phosphate, di-myristyl acid phosphate, di-palmityl acid phosphate, etc. Among them, from a viewpoint, for example, of non-crystallinity and molecular chain entanglement with the lubricant base oil, oleyl acid phosphate and isostearyl acid phosphate are preferred.

The molecular weight of the composition of the specified phosphorus compound and the metal is preferably 3,000 or lower because the compatibility with the high-consistency material is improved by fine dispersion. It is more preferably 2,500 or lower. Further, it is preferably 80 or higher, and more preferably 100 or higher from a viewpoint, for example, of separation restriction due to increased concentration of the polar group. The molecular weight can be obtained by calculation. In the following IS-SA-Ca, the molecular weight (weight average molecular weight) is measured by GPC.

In the present composition, providing that a composition of the specified phosphorus compound and the metal is contained, a specified phosphorus compound not composited with the metal may be contained partially. However, if the ratio of the specified phosphorus compound itself increases in the present composition, the ionic bondability is lowered, the adhesion (viscosity) is lowered, and the effect of preventing corrosion is lowered, and therefore, it is preferred that the ratio of the specified phosphorus compound not composited with the metal is smaller.

As an index of measuring the ratio of the specified phosphorus compound itself, there is a method of measuring pH of the present composition. As the ratio of the acid phosphate ester increases, the residual amount of the phosphate group (P—OH group) is increased to increase the acidity (lower the pH). As the ratio of the acid phosphate ester is lowered, the residual amount of the phosphate group (P—OH group) is decreased to lower the acidity (increase pH). The pH of the present composition is preferably 4 or more, and more preferably 5.5 or more.

Further, the ratio (molar ratio) of the specified phosphorus compound and the metal can be shown also by a value f, assuming $f = 1 \times x - m \times y$ where the valence number of the specified phosphorus compound is $x^-$, the valence number of the metal is $y^-$, the mol number of the specified phosphorus compound is 1, and mol number of the metal is m. In the range of $f > 0$, the specified phosphorus compound is excessive to the metal and the phosphate group (P—OH) remains. At $f = 0$, the specified phosphorus compound is equivalent to the metal and the phosphate group (P—OH group) does not remain. Further, in a range of $f < 0$, the specified phosphorus compound is insufficient to the metal and the phosphate group (P—OH group) does not remain. For increasing the pH of the present composition, it is preferred that $f \leq 0$.

In the present composition, an organic solvent, a stabilizer, a corrosion inhibitor, a dye, a viscosity improver, a filler, etc. can be added in addition to the high-consistency material and the composition of the specified phosphorus compound and the metal as long as the function of the present composition is not deteriorated.

The present composition can be obtained by mixing the high-consistency material containing a lubricant base oil and the amide compound, a composition of a specified phosphorus compound and a metal, and optionally added components. Further, the present composition can be obtained also by mixing a lubricant base oil, an amide compound, a composition of a specified phosphorus compound and a metal, and optionally added components. A high-consistency film is kept at the coated surface after coating due to the consistency of the high-consistency material. When an amide compound of higher melting point is used, viscosity similar to that under a normal temperature is maintained at a high temperature lower than the melting point and the high-consistency film is maintained on the coating surface after coating. The composition of the specified phosphorus compound and the metal acts as a metal adsorption component and contributes to the improvement of the adhesion of the high-consistency film on the metal surface. The present composition can be coated on the surface of the material to be coated by coating the present composition on the surface of the material to be coated, or dipping the material to be coated in the present composition.

It appeared that even though the composition of the specified phosphorus compound and the metal acts as a metal adsorption component, it lowers the melting point of the present composition. Accordingly, the composition of the specified phosphorus compound and the metal lowers the upper limit of a temperature at which the high consistency of the high-consistency material is maintained, leading to deterioration of a property of the high-consistency material of keeping high consistency at a high temperature in the same way as at a normal temperature. As a result, the metal surface may not be protected stably at a high temperature. This is presumably because that acid components contained in the specified phosphorus compound disturb formation of a network structure of the amide compound contained in the high-consistency material.

The acid components are contained in the specified phosphorus compound in the form of a P—OH group (phosphate group) or a P—O⁻ group (phosphoric acid anion group). The acid component is contained in the form of a —COOH group (carboxylic acid group) or a —COO⁻ group (carboxylic acid anion group), also in the metal-containing compound (metal ion supplying source) constituting the composition of the specified phosphorus compound and the metal. These are expressed as acidic groups.

In the present application, the ratio (a/b) of the number of amide groups (a) to the number of acidic groups (b) is within a range of 1.1 to 6.0. By having the ratio, the present composition maintains both adhesion to the metal and a property of the high-consistency material of keeping high consistency at a high temperature in the same way as at a normal temperature, thereby protecting a metal surface stably. From a viewpoint of keeping a property of high consistency at a high temperature in the same way as at a normal temperature, a/b is preferably 1.5 or higher, and more preferably 2.0 or higher. Further, from a viewpoint of adhesion to the metal, a/b is preferably 5.5 or lower, and more preferably 5.0 or lower.

The thickness of the high-consistency film coated on the surface of the material to be coated is preferably 100 m or smaller from a viewpoint of preventing outward flow or preventing leakage from the coated portion. It is more preferably 50 m or smaller. On the other hand, it is preferably at a predetermined thickness or larger from a viewpoint, for example, of mechanical strength, etc. of the high-consistency film to be coated. The lower limit of the film thickness includes, for example, 0.5 µm, 2 µm, 5 µm, etc.

The present composition can be used, for example, to lubrication or corrosion protection, etc. For use in the corrosion protection, it can be used, for example, as a corrosion inhibitor for a terminal-fitted electric wire.

Next, a terminal-fitted electric wire according to the present application is to be described.

A terminal-fitted electric wire according to the present application is an electric wire in which terminal is connected to the conductor end of the insulation electric wire, and the electric connection portion between the terminal and the electric wire conductor is covered with a high-consistency film including a high-consistency material containing a lubricant base oil and an amide compound, and a composition of a specified phosphorus compound and a metal. Thus, corrosion at the electric connection portion is prevented.

Figure 1:
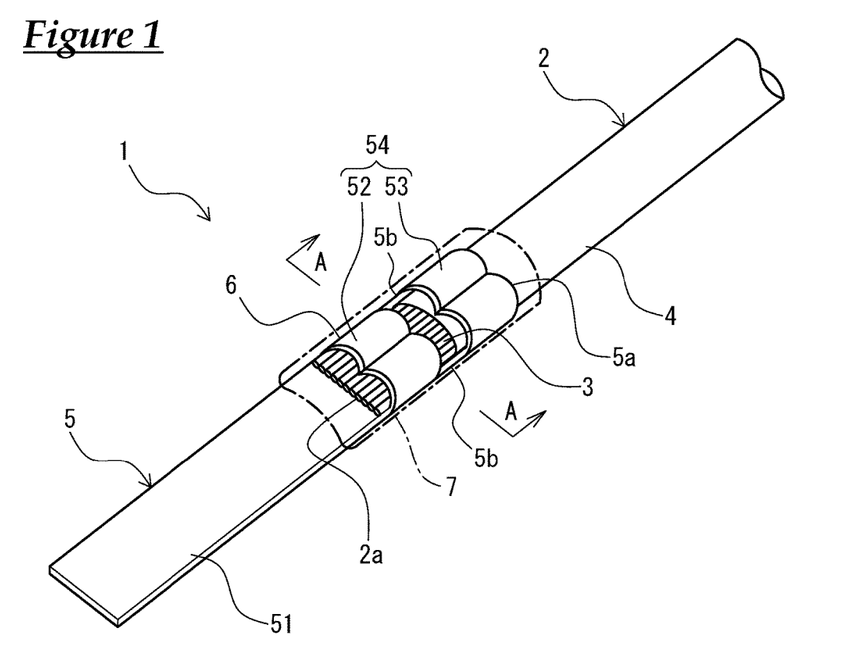
FIG. 1 is a perspective view of a terminal-fitted electric wire according to a preferred embodiment of the present application.
Figure 2:
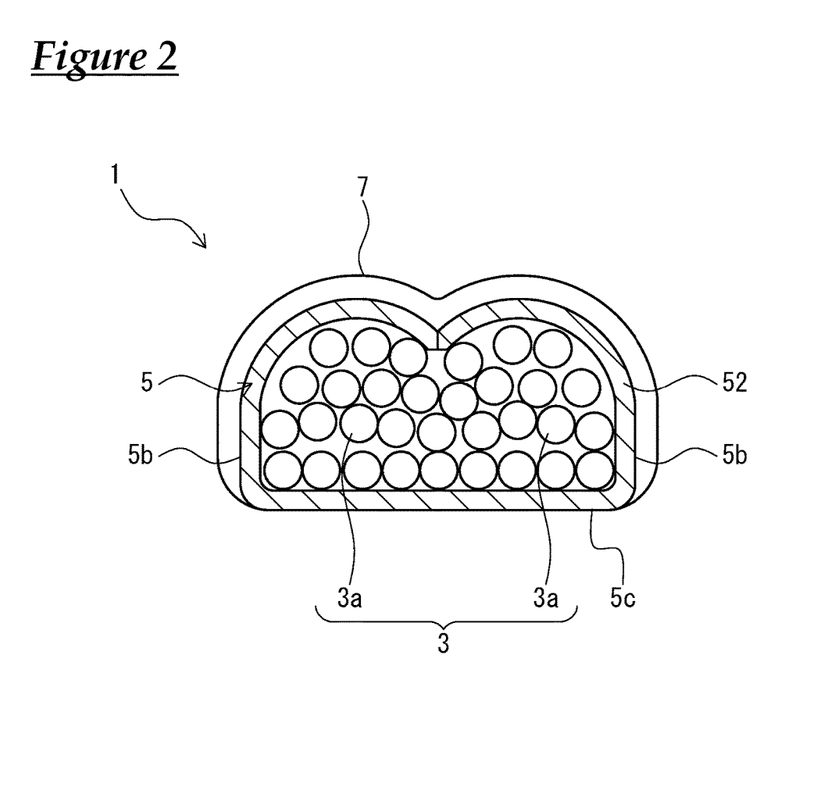
FIG. 2 is a longitudinal cross sectional view along line A-A in FIG. 1.

FIG. 1 is a perspective view of a terminal-fitted electric wire according to a preferred embodiment of the present application, and FIG. 2 is a vertical cross sectional view along line A-A in FIG. 1. As illustrated in FIG. 1 and FIG. 2, in a terminal-fitted electric wire 1, an electric wire conductor 3 of a covered electric wire 2 covered with an insulation cover (insulator) 4 and a terminal 5 are electrically connected by an electric connection portion 6.

The terminal 5 has a tab-shaped connection part 51 formed by an elongate flat plate to be connected with a mating terminal, and an electric wire fixing portion 54 containing a wire barrel 52 and an insulation barrel 53 formed at the extended end of the connection portion 51. The terminal 5 can be formed (fabricated) to a predetermined shape by pressing a plate material made of a metal.

In the electric connection portion 6, the insulation cover 4 at the end of the covered electric wire 2 is stripped to expose the electric wire conductor 3, and the exposed electric wire conductor 3 is press-bonded to one side of the terminal 5 to connect the covered electric wire 2 with the terminal 5. The wire barrel 52 of the terminal 5 is crimped over the electric wire conductor 3 of the covered electric wire 2 to electrically connect the electric wire conductor 3 with the terminal 5. Further, the insulation barrel 53 of the terminal 5 is crimped over the insulation cover 4 of the covered electric wire 2.

In the terminal-fitted electric wire 1, a range surrounded by a dotted chain is covered with a high-consistency film 7 obtained from the present composition. Specifically, a range from the surface portion of the terminal 5 ahead of the top end of the electric wire conductor 3 partially exposed from the insulation cover 4 to the surface portion of the insulation cover 4 behind the backward end of the electric wire conductor 3 partially exposed from the insulation cover 4 is covered with the high-consistency film 7. That is, on the side of the top end 2a of the covered electric wire 2, the terminal-fitted electric wire 1 is covered with the high-consistency film 7 in a range that protrudes slightly from the top end of the electric wire conductor 3 to the side of the connection portion 51 of the terminal 5. On the side of the top end 5a of the terminal 5, the terminal-fitted electric wire 1 is covered with the high-consistency film 7 in a range that protrude slightly from the end of the insulation barrel 53 to the side of the insulation cover 4 of the covered electric wire 2. Then, as shown in FIG. 2, the lateral side 5b of the terminal 5 is also covered with the high-consistency film 7. The back surface 5c of the terminal 5 may or may not be covered with the high-consistency film 7. The peripheral end of the high-consistency film 7 contains a portion in contact with the surface of the terminal 5, a portion in contact with the surface of the electric wire conductor 3, and a portion in contact with the surface of the insulation cover 4.

In this way, the electric connection portion 6 is covered with the high-consistency film 7 at a predetermined thickness along the shape of the outer periphery of the terminal 5 and the covered electric wire 2. Thus, a portion of the electric wire 2 from which the electric wire conductor 3 is exposed is completely covered with the high-consistency film 7 so as not to be exposed to the outside. Accordingly, the electric connection portion 6 is completely covered with the high-consistency film 7. Since the high-consistency film 7 has excellent adhesion with all of the electric wire conductor 3, the insulation cover 4, and the terminal 5, the high-consistency film 7 prevents intrusion of moisture, etc. from the outside to the electric wire conductor 3 and the electric connection portion 6, which may corrode the metal portion. Further, since the high-consistency film 7 is excellent in adhesion, a gap is less likely to be formed between the high-consistency film 7 and any of the electric wire conductor 3, the insulation cover 4, and the terminal 5 at the peripheral end of the high-consistency film 7 even when the electric wire is bent, for example, in the process from the production of the wire harness to the attachment to a vehicle, thereby maintaining the waterproofness and corrosion protection function.

The present composition forming the high-consistency film 7 is coated for a predetermined range. For the coating of the present composition forming the high-consistency film 7, known methods such as dripping, coating, etc. can be used. The present composition is excellent in fluidity, and therefore coating using the present composition is performed at a normal temperature.

The high-consistency film 7 is formed at a predetermined thickness for a predetermined range. The thickness is, preferably, within a range of 0.01 to 0.1 mm. If the high-consistency film 7 is excessively thick, it is difficult to insert the terminal 5 into the connector. If the high-consistency film 7 is excessively thin, the corrosion protection function tends to be lowered.

The electric wire conductor 3 of the covered electric wire 2 is a stranded wire composed of a plurality of wires 3a. In this case, the stranded wire may be composed of a single type of metal wires or two or more types of metal wires. Further, the stranded wire may also be composed of organic fibers in addition to metal wires. The stranded wire composed of a single type of metal wires means that all metal wires forming the stranded wire are formed from the same metal material, while the stranded wire composed of two or more types of metal wires means that the stranded wire contains metal wires formed from different metal materials. The stranded wire may also include reinforcing wires (tension members) for reinforcing the covered electric wire 2.

The material for metal wire forming the electric wire conductor 3 includes, for example, copper, copper alloys, aluminum, aluminum alloys, or materials formed by applying various platings to the materials described above. The material for the metal wire as the reinforcing wires includes, for example, copper alloys, titanium, tungsten, stainless steel, etc. Further, the organic fibers as the reinforcing wire include, for example, KEVLAR. Metal wires forming the electric wire conductor 3 are preferably aluminum, aluminum alloys or materials formed by applying various types of plating to the materials described above from a viewpoint of reducing the weight.

The material for the insulation cover 4 includes, for example, rubber, polyolefin, PVC, thermoplastic elastomer, etc. They may be used alone or two or more of them may be used in combination. Various additives may be added properly to the material of the insulation cover 4. The additives include, for example, flame retardants, fillers, colorants, etc.

The material for the terminal 5 (material for matrix) includes various copper alloys, copper, etc. in addition to generally used brass. The surface of the terminal 5 may be applied with plating of various metals such as tin, nickel, and gold partially (for example, to contacts) or entirely.

While a terminal is press-bonded to the end of the electric wire conductor in the terminal-fitted electric wire 1 illustrated in FIG. 1, other known electric connection methods such as welding may also be used instead of the press-bonding connection.

EXAMPLE

The present invention is to be described by way of examples but the present invention is not restricted to the examples.

(Preparation of High-consistency Material)

High-consistency materials were prepared by mixing lubricant base oils and amide compounds according to blending compositions (parts by mass) shown in Tables 1 and 2.

Lubricant base oil A: Mineral type base oil (kinematic viscosity=4.0 mm$^2$/s (100° C.))

Lubricant base oil B: Mineral type base oil (kinematic viscosity=11.1 mm$^2$/s (100° C.))

Lubricant base oil C: Synthetic type base oil (kinematic viscosity=100.0 mm$^2$/s (100° C.))

Amide compound: Ethylene bisstearylamide "SLIPACKS E" (melting point 150° C., molecular weight 592) manufactured by Nippon Kasei Chemical Co. Ltd.

(Preparation of Composition of Phosphorus Compound and Metal)

Preparation Example 1

OL-Li

Into a 500 mL flask, 50 g (acid value 0.163 mol) of oleyl acid phosphate ("Phoslex A18D" manufactured by SC Organic Chemical Co., Ltd., molecular weight 467 (average), acid value 183 mgKOH/g) and 50 mL of methanol were added and stirred at 50° C. to form a uniform solution. A solution of 6.84 g (0.163 mol) of lithium hydroxide monohydrate in 50 mL of methanol was added therein slowly. The clear liquid was stirred for 30 minutes with maintaining a temperature of 50° C., and methanol and formed water were distilled off under a reduced pressure by a rotary evaporator. Then, after adding 50 mL of toluene, the formed water was distilled off by azeotropy through vacuum distillation to obtain a clear and viscous aimed product.

Preparation Example 2

IS-Li

An aimed clear viscous product was obtained in the same manner as in Preparation Example 1 except for using 50 g (acid value 0.159 mol) of isostearyl acid phosphate ("Phoslex A18OL" manufactured by SC Organic Chemical Co., Ltd., molecular weight 487 (average), acid value 178 mgKOH/g) instead of oleyl acid phosphate and changing the amount of lithium hydroxide monohydrate added thereto to 6.67 g (0.159 mol).

Preparation Example 3

IS-Ca

An aimed clear viscous product was obtained in the same manner as in Preparation Example 1 except for using 50 g (acid value 0.159 mol) of isostearyl acid phosphate ("Phoslex A18OL" manufactured by SC Organic Chemical Co., Ltd., molecular weight 487 (average), acid value 178 mgKOH/g) instead of oleyl acid phosphate and changing the amount of calcium hydroxide added thereto to 5.89 g (0.0795 mol).

Preparation Example 4

IS-SA-Ca

An aimed viscous brown product was obtained by charging, into a 500 mL flask, 100 g (acid value 0.317 mol) of isostearyl acid phosphate ("Phoslex A18OL" manufactured by SC Organic Chemical Co., Ltd., molecular weight 487 (average), acid value 178 mgKOH/g) and 116 g of super basic calcium alkyl salicylate (Ca content: 8.0 mass %, super basic Ca content: 5.5 mass %) (super basic Ca mass 6.4 g=0.159 mol), stirring it at 120° C. for 3 hours and then cooling it to a room temperature.

(Measurement of Molecular Weight of Composition of Phosphorus Compound and Metal)

The molecular weight was obtained by calculation. As for the IS-SA-Ca, the molecular weight (weight average molecular weight) was measured by GPC (solvent: chloroform, column: TSKgel G2500H×L (manufactured by Tosoh Corporation)).

(Preparation of Metal Surface Coating Composition)

A metal surface coating composition was prepared by mixing a composition of each phosphorus compound and metal obtained as one of preparation examples 1 to 4, and a high-consistency material, each at a predetermined ratio (parts by mass) under heating at 160° C. As shown in table 2, an antioxidant was added as an optional additive: "IrganoX1010" manufactured by BASF Co., Ltd.

(Measurement of Melting Point)

The melting point was measured by DSC (temperature elevation rate 10° C./minute, atmospheric condition).

(Evaluation of Maintainability at High Temperature)

The metal surface coating composition was heated to 160° C. to the liquid state, and a tin-plated copper plate having a length of 80 mm was immersed into the liquid by a length of 40 mm, and thus a thin film coating was applied on the tin-plated copper plate. Then, the tin-plated copper plate was left for 120 hours in a thermostat chamber at 120° C. with keeping a standing state with the thin film coated portion of the plate locates an upper thereof. Then, the tin-plated copper plate was taken out of the thermostat chamber, and cooled to a normal temperature. Then, the length for which the metal surface coating composition flows down along the plate was measured. The flow down length of 1.0 mm or shorter was evaluated as good in maintainability at high temperature. The flow down length of more than 1.0 mm to 5.0 mm or shorter was evaluated as moderate in maintainability at high temperature. The flow down length of more than 5.0 mm was evaluated as bad in maintainability at high temperature.

(Corrosion Test)

The metal surface coating composition was heated to 160° C. to the liquid state, and a tin-plated copper plate of 60 mm×80 mm was immersed into the liquid for 15 seconds. Then, the tin-plated copper plate was taken out of the liquid at a speed of 10 mm/second, and thus a thin film coating was applied on the tin-plated copper plate. Then, a neutral salt water spray test was conducted at 35° C. according to JIS K2249 (salt solution concentration: 50 g/L), and the degree of rust generation after 120 hours was evaluated. Similarly, a neutral salt water spray test was conducted for a thin film coated tin-plated copper plate after leaving it for 120 hours in a thermostat chamber at 120° C. with the plate standing up in its length direction.

A test sheet was prepared to be cross cut to 100 square pieces each 5 mm square pieces with lines of about 0.5 mm in width. The test sheet was piled up on the evaluated and cleaned tin film coated tin-plated copper plate to count the number of the pieces in which rust was generated in at least one or more points by observation with the naked eye. The relation between the grades and the generation of rust is as follows:

| Grades | Generation of rust |
|---|---|
| A grade | 0% |
| B grade | 1-10% |
| C grade | 11-25% |
| D grade | 26-50% |
| E grade | 50-100% |

TABLE 1

| High-consistency material | Lubricant base oil A | 70 | 63 | 56 | 52 | 35 |
| | Amide compound | 30 | 27 | 24 | 18 | 15 |
| Phosphorus compound | IS-SA-Ca | 0 | 10 | 20 | 30 | 50 |
| Number of amide groups/Number of acidic groups | | — | 4.1 | 1.8 | 0.9 | 0.5 |
| Melting point(° C.) | | 144 | 132 | 126 | 112 | 105 |

Table 1 shows the results of investigation on how the melting point is influenced by the ratio of the number of amide groups to the number of acidic groups. From Table 1, when the content of the phosphorus compound (composition) is higher and the number of the acidic groups contained in the phosphorus compound is larger, the melting point of the composition is lowered.

TABLE 2

| | | Molecular weight | Examples | | | | | | | | Comparative Examples | | | |
| | | | 1 | 2 | 3 | 4 | 5 | 6 | 7 | 8 | 1 | 2 | 3 | 4 |
|---|---|---|---|---|---|---|---|---|---|---|---|---|---|---|
| High-consistency material | Lubricant base oil A | | 20 | 10 | 55 | | 80 | 25 | 25 | | 70 | 25 | | 15 |
| | Lubricant base oil B | | | 10 | | 48 | | | 25 | | | 65 | 53 | 5 |
| | Lubricant base oil C | | | | | | | | | 5 | | | | |
| | Amide compound | | 60 | 60 | 30 | 44 | 15 | 45 | 25 | 24 | 30 | 10 | 22 | 64 |
| Phosphorus compound | OL-Li | 505 | 20 | 20 | | | | | | | | 25 | | |
| | IS-Li | 521 | | | 15 | | | | | | | | | |
| | IS-Ca | 1068 | | | | 8 | | | | | | | | |
| | IS-SA-Ca | 880 | | | | | 5 | 30 | 25 | 20 | | | | 16 |
| Antioxidant | | | 1 | 1 | 1 | 1 | 1 | 1 | 1 | 1 | 1 | 1 | 1 | 1 |
| The number of amide groups/the number of acidic groups | | | 3.1 | 3.1 | 2.2 | 5.9 | 4.6 | 2.3 | 1.1 | 1.8 | — | — | 0.9 | 6.2 |

TABLE 2-continued

| | Molecular weight | Examples | | | | | | | | Comparative Examples | | | |
|---|---|---|---|---|---|---|---|---|---|---|---|---|---|
| | | 1 | 2 | 3 | 4 | 5 | 6 | 7 | 8 | 1 | 2 | 3 | 4 |
| Maintainability at high temperature | | Good | Good | Good | Good | Good | Good | Good | Good | Bad | Bad | Bad | Good |
| Corrosion After left at room temperature | | A | A | A | A | A | A | A | A | E | E | C | B |
| After flow down test | | A | A | A | A | A | A | A | A | E | E | D | B |

The metal surface coating compositions of comparative examples 1 and 2 each contain a high consistency material containing a lubricant base oil and an amide compound, but do not contain a composition of a phosphorus compound and a metal. Thus the compositions of comparative examples 1 and 2 are inferior in maintainability at high temperature since adhesion to the metal is not good and dripping is found at high temperature. Further they are inferior also in corrosion test since adhesion to the metal is not good. The metal surface coating compositions of comparative examples 3 and 4 each contain a high consistency material containing a lubricant base oil and an amide compound, and a composition of a phosphorus compound and a metal. However, as for comparative example 3, the ratio of the number of amide groups/the number of acidic groups is lower than 1.1, and thus it is inferior in maintainability at high temperature since dripping is caused at the high temperature due to lowering of the melting point and degradation of maintainability at high temperature. Further, comparative example 3 is inferior also in corrosion test. As for comparative example 4, the ratio of the number of amide groups/the number of acidic groups is over 6.0, and thus it is inferior in adhesion to the metal and in corrosion test.

On the other hand, as for examples 1 to 8, the ratio of the number of amide groups/the number of acidic groups falls within a predetermined range, and thus they are excellent in maintainability at high temperature since dripping is not found at high temperature. Further, they show excellent results in corrosion test.

An embodiment of the present invention has been described specifically but the present invention is no way restricted to the embodiment described above but can be modified variously within a range not departing from the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A terminal fitted electric wire, comprising:
a terminal,
an electric conductor, and
an electric connection part formed between the terminal and the electric conductor, and covered with a metal surface coating composition comprising:
a high-consistency material comprising a lubricant base oil and an amide compound, and
a composition of a phosphorus compound comprising one or more compounds represented by the general formulae (1) and (2) and a metal, wherein the ratio (a/b) of the number of amide groups (a) and the number of acidic groups (b) is within a range of 1.1 to 6.0, and wherein the amide compound has a melting point of 120° C. or higher and comprises one or more compounds represented by the following general formulae (3) to (5):

[Chem. 1]

(1)

[Chem. 2]

(2)

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms, among which at least one is a hydrocarbon group having 1 to 30 carbon atoms, and $R^{14}$ to $R^{16}$ each represent independently a hydrogen atom or a hydrocarbon group having 1 to 30 carbon atom among which at least one is a hydrocarbon group having 1 to 30 carbon atoms;

[Chem. 3]

$$R^{21}\text{—CO—NH—}R^{22} \qquad (3)$$

[Chem. 4]

$$R^{23}\text{—CO—NH—}Y^{31}\text{—NH—CO—}R^{24} \qquad (4)$$

[Chem. 5]

$$R^{25}\text{—NH—CO—}Y^{32}\text{—CO—NH—}R^{26} \qquad (5)$$

where $R^{21}$ to $R^{26}$ each represent independently a saturated or unsaturated linear hydrocarbon group having 5 to 25 carbon atoms, $R^{22}$ may be hydrogen, and $Y^{31}$ and $Y^{32}$ represent a divalent hydrocarbon group having 1 to 10 carbon atoms selected from an alkylene group and a phenylene group having 1 to 10 carbon atoms, or an alkylphenylene group having 7 to 10 carbon atoms.

2. The terminal fitted electric wire according to claim 1, wherein the composition of the phosphorus compound and the metal is made of at least one of a metal hydroxide and a metal carboxylate, and the phosphorus compound.

3. The terminal fitted electric wire according to claim 2, wherein the metal carboxylate is a metal salicylate.

4. The terminal fitted electric wire according to claim 1, wherein the amide compound is a fatty acid amide having a melting point within a range of 120° C. to 200° C.

5. The terminal fitted electric wire according to claim 1, wherein the phosphorus compound has one or more branched linear structures or one or more carbon-carbon double bond structures in the structure of the hydrocarbon groups having 1 to 30 carbon atoms.

6. The terminal fitted electric wire according to claim 1, wherein the metal forming the composition together with the phosphorus compound is at least one selected from alkali metals, alkaline earth metals, aluminum, titanium, and zinc.

7. The terminal fitted electric wire according to claim 1, wherein the composition of the phosphorus compound and the metal has a molecular weight of 3000 or lower.

* * * * *